United States Patent
Boeck et al.

(10) Patent No.: US 10,994,402 B2
(45) Date of Patent: May 4, 2021

(54) MACHINE-TOOL OPERATING DEVICE

(71) Applicant: Robert Bosch GmbH, Stuttgart (DE)

(72) Inventors: Cornelius Boeck, Kirchheim (DE);
Daniel Barth, Leinfelden-Echterdingen (DE); Florian Esenwein, Leinfelden-Echterdingen (DE); Manfred Lutz, Filderstadt (DE); Joachim Schadow, Stuttgart (DE); Joerg Maute, Sindelfingen (DE); Joern Stock, Wernau (DE)

(73) Assignee: Robert Bosch GmbH, Stuttgart (DE)

( * ) Notice: Subject to any disclaimer, the term of this patent is extended or adjusted under 35 U.S.C. 154(b) by 289 days.

(21) Appl. No.: 15/527,247

(22) PCT Filed: Dec. 3, 2015

(86) PCT No.: PCT/EP2015/078529
§ 371 (c)(1),
(2) Date: May 16, 2017

(87) PCT Pub. No.: WO2016/091715
PCT Pub. Date: Jun. 16, 2016

(65) Prior Publication Data
US 2017/0334053 A1    Nov. 23, 2017

(30) Foreign Application Priority Data

Dec. 9, 2014    (DE) .................... 10 2014 225 326.8
Jul. 29, 2015    (DE) .................... 10 2015 214 388.0

(51) Int. Cl.
*B25F 5/00* (2006.01)
*F16P 3/00* (2006.01)

(52) U.S. Cl.
CPC . *B25F 5/00* (2013.01); *F16P 3/00* (2013.01)

(58) Field of Classification Search
CPC ..................................... B25F 5/00; F16P 3/00
(Continued)

(56) References Cited

U.S. PATENT DOCUMENTS

| 7,658,237 B2 * | 2/2010 | Rudolf ...................... B25F 5/00 |
| | | 173/11 |
| 2005/0161241 A1 * | 7/2005 | Frauhammer ............. B25F 5/00 |
| | | 173/1 |
| 2006/0185865 A1 | 8/2006 | Jung et al. |

FOREIGN PATENT DOCUMENTS

| CN | 201140302 Y | 10/2008 |
| EP | 0 544 483 A1 | 6/1993 |

(Continued)

OTHER PUBLICATIONS

International Search Report corresponding to PCT Application No. PCT/EP2015/078529, dated Mar. 4, 2016 (German and English language document) (5 pages).

*Primary Examiner* — Michelle Lopez
(74) *Attorney, Agent, or Firm* — Maginot, Moore & Beck LLP

(57) ABSTRACT

A machine-tool operating device includes at least one operating unit and at least one electronics unit. The at least one operating unit has at least one operating element that is configured to be actuated by an operator and at least one further operating element that is configured to be actuated by an operator. The at least one electronics unit is configured at least for switching at least one energy supply of a drive unit in accordance with actuation of the operating element and of the further operating element. One or more of the operating element and the further operating element are configured as a touch-sensitive electronic operating element.

14 Claims, 2 Drawing Sheets

(58) Field of Classification Search
USPC .............................................................. 173/1
See application file for complete search history.

(56) References Cited

FOREIGN PATENT DOCUMENTS

| EP | 1 440 771 A1 | 7/2004 |
| EP | 1 563 962 A1 | 8/2005 |
| GB | 2 410 205 A | 7/2005 |

\* cited by examiner

MACHINE-TOOL OPERATING DEVICE

This application is a 35 U.S.C. § 371 National Stage Application of PCT/EP2015/078529, filed on Dec. 3, 2015, which claims the benefit of priority to Serial No. DE 10 2014 225 326.8, filed on Dec. 9, 2014 in Germany and Serial No. DE 10 2015 214 388.0, filed on Jul. 29, 2015 in Germany, the disclosures of which are incorporated herein by reference in their entirety.

BACKGROUND

A power-tool operating device, comprising an operating unit, which has an operating element that can be actuated by an operator, and a further operating element that can be actuated by an operator, is already known from EP 1 563 962 B1. The already known power-tool operating device additionally comprises an electronic unit that is designed to switch at least one energy supply of a drive unit in dependence on an actuation of the operating element and of the further operating element.

SUMMARY

The disclosure is based on a power-tool operating device, having at least one operating unit, which has at least one operating element that can be actuated by an operator, and at least one further operating element that can be actuated by an operator, and having at least one electronic unit, which is designed at least to switch at least one energy supply of a drive unit at least in dependence on an actuation of the operating element and of the further operating element.

It is proposed that the operating element and/or the further operating element be realized as electronic operating elements/an electronic operating element that are/is realized so as to be touch-sensitive. Preferably, an actuation of the operating element and/or of the further operating element can be interrogated electronically by means of the electronic unit. An "electronic unit" is to be understood to mean, in particular, a unit having at least one control electronics unit. A "control electronics unit" is to be understood to mean, in particular, a unit having a processor unit and having a storage unit, and having an operating program stored in the storage unit.

An "operating unit" is to be understood here to mean, in particular, a unit having at least one component, in particular the operating element and/or the further operating element, that can be actuated directly by an operator, and which is designed to influence and/or change a process and/or a state of a unit coupled to the operating unit as a result of an actuation and/or an input of parameters. An "operating element" is to be understood to mean, in particular, an element designed to receive an input quantity from an operator in an operating operation and, in particular, to be contacted directly by an operator, wherein touching of the operating element is sensed, and/or an actuating force exerted upon the operating element is sensed and transferred for the purpose of controlling a unit. "Designed" is to be understood to mean, in particular, specially configured, specially programmed and/or specially equipped. That an element and/or a unit are/is designed for a particular function is to be understood to mean, in particular, that the element and/or the unit fulfill/fulfills and/or execute/executes this particular function in at least one application state and/or operating state.

Preferably, the operating element and/or the further operating element comprise/comprises a switching contact that can be switched as a result of an actuation of the operating element. The switching contact of the respective operating element is preferably designed to generate a switching signal, realized as an electrical characteristic quantity, in dependence on a touch on the respective operating element. The switching signal can preferably be transmitted to the electronic unit, and evaluated and processed further by the latter. The operating element and/or the further operating element are/is preferably realized as resistive, capacitive or inductive operating elements/a resistive, capacitive or inductive operating element. The operating unit may comprise a multiplicity of operating elements, which are realized as electronic operating elements, and the respective actuation of which can be interrogated electronically, in particular sensed electronically and processed further electronically, by the electronic unit. It is also conceivable, however, for at least one of the operating elements to be realized as a mechanical operating element, the respective actuation of which can be interrogated electronically, in particular sensed electronically and processed further electronically, by the electronic unit, such as, for example, by means of at least one sensor element or the like.

By means of the design according to the disclosure, advantageously, a power-tool operating device that allows intuitive operation can be provided. In addition, advantageously, it is possible to use operating elements that are designed for a low operating current, since switch-off currents of the operating elements can be low, and in particular do not have to correspond to a current that is flowing through the drive unit. Advantageously, a high degree of operator safety can be achieved.

Furthermore, it is proposed that the electronic unit be designed to switch at least one power-tool function, that is other than an activation or deactivation of the energy supply of the drive unit, at least in dependence on a sensed operator movement on the operating element and/or on the further operating element. The power-tool function that is other than an activation or deactivation of the energy supply of the drive unit may be, for example, a locking switching function, a dead-man's switching function, a rotational-speed function of the drive unit, a working function (drilling, chipping, percussion drilling, automatic tool change, etc.), or another power-tool function considered appropriate by persons skilled in the art. The operator movement that is effected on the operating element and/or on the further operating element and sensed may be, for example, a swipe movement, a tapping movement, a relative movement of two fingers on the operating element and/or on the further operating element, a drawing of a symbol on the operating element and/or on the further operating element by means of at least one finger, or another operator movement considered appropriate by persons skilled in the art. The electronic unit preferably has at least one evaluation unit, which is designed to evaluate an operator movement on the operating element and/or on the further operating element. Preferably, the electronic unit is designed at least to activate or deactivate, as a result of an actuation sequence of the operating element and/or of the further operating element, a power-tool function assigned to the actuation sequence, or a switching of an energy supply of the drive unit. If an operator actuates the operating element and/or the further operating element, for example, at least twice in succession within a predefined time period, an activation of the energy supply of the drive unit is effected. The predefined time period is, in particular, less than 20 seconds, preferably less than 10 seconds, and particularly preferably less than 5 seconds. Likewise conceivable are other actuations of the operating element and/or of the further operating element, for activating or deactivating a power-tool function or a switching of an energy supply of the drive unit, considered appropriate by persons skilled in the art. Advantageously, convenient operation can be achieved by means of the design according to the disclosure.

It is additionally proposed that the operating unit have at least one additional operating element, realized as an electronic operating element, which is realized so as to be touch-sensitive. As an alternative or in addition to the additional operating element, it is conceivable for the electronic unit of the power-tool operating device to have at least one sensor unit, which is designed to sense at least one sensor characteristic quantity, realized as a proximity and/or contact characteristic quantity, in dependence on which at least one power-tool function or the energy supply of the drive unit can be switched. The sensor characteristic quantity may be, for example, a bearing contact, sensed by means of a sensor unit, of at least one hand or a part of a hand of an operator on the operating element and/or on the further operating element of the operating unit, a distance of a hand of an operator from the operating element that can be sensed, for example by means of the sensor unit, or another characteristic quantity, considered appropriate by persons skilled in the art. The sensor unit preferably has at least one sensor element, which is realized as a contact sensor. The sensor element in this case may be realized as a membrane switch, as an optical sensor element (light barrier, etc.), or as another sensor element considered appropriate by persons skilled in the art, that is designed to sense a contact, in particular a touch. The design according to the disclosure makes it possible, advantageously, to realize convenient activation or deactivation of at least one further power-tool function. In addition, advantageously, in the case of activation of an energy supply of the drive unit and/or maintenance of an energy supply of the drive unit, a touch on the additional operating element can be taken into account by means of the electronic unit. Advantageously, a high degree of safety can be achieved, against the drive unit being put into operation unintentionally.

It is additionally proposed that the electronic unit be designed to switch at least one locking switching function of the electronic unit at least in dependence on an actuation of the additional operating element. A "locking switching function" is to be understood here to mean, in particular, a function in which at least maintenance of an energy supply of a drive unit, following an actuation of the operating element, is at least substantially independent of the operating element remaining actuated. The locking switching function is preferably designed to control electronically, by open-loop and/or closed-loop control, maintenance of an energy supply of a drive unit. The locking switching function and the functioning thereof are to be considered to be known, at least substantially, by persons skilled in the art. The design according to the disclosure advantageously enables the energy supply of the drive unit to be maintained without sustained actuation of the operating element, for example to enable an operator to achieve a comfortable grip.

Furthermore, it is proposed that the electronic unit have at least one locking switching function and at least one dead-man's switching function, which can be switched at least in dependence on an actuation of the operating element and/or of the further operating element. The term "dead-man's switching function" is intended here to define, in particular, a function in which, in particular, at least one energy supply of the drive unit can be prevented as a result of absence of an actuation of at least the operating element and/or of the further operating element. Preferably, the dead-man's switching function is designed to interrupt an energy supply of a drive unit as soon as the operating element and/or the further operating element are/is unactuated after an actuation has been effected, or an operator, after an actuation has been effected, removes a touch on the operating element and/or of the further operating element. The dead-man's switching function and the functioning thereof are to be considered to be known, at least substantially, by persons skilled in the art.

The electronic unit is designed at least to select automatically the locking switching function or the dead-man's switching function at least in dependence on an actuation characteristic quantity, at least in dependence on a sensor characteristic quantity and/or at least in dependence on a communication with an external unit. Preferably, the electronic unit has at least one communication unit that is designed for communication with an external unit, wherein the locking switching function or the dead-man's switching function is selectable at least partly automatically in dependence on the communication with the external unit. The communication unit is preferably realized as a wireless communication unit. The communication unit in this case may be realized as a WLAN communication unit, as a Bluetooth communication unit, as a radio communication unit, as an RFID communication unit, as an NFC unit, as an infrared communication unit, as a mobile telephony communication unit, as a Zigbee communication unit, or the like. Particularly preferably, the communication unit is designed for bidirectional data transmission. In an alternative design, the communication unit is realized as a wired communication unit such as, for example, a LAN communication unit, a USB communication unit, as a Powerline communication unit, as a CAN-bus Communication unit, as an Ethernet communication unit, as a twisted-pair cable communication unit (CAT5 or CAT6), or the like. It is also conceivable, however, that the communication unit, as an alternative to being designed for wireless or wired communication, is designed for wireless and wired communication. The external unit may be realized as a portable data processing unit such as, for example, as a smartphone, as a laptop, as a tablet PC, etc., as a company central computer, as a router, or as another external unit considered appropriate by persons skilled in the art. Alternatively or additionally, it is conceivable for the power-tool operating device to have at least one input unit, by means of which a manual selection can be made between the locking switching function and the dead-man's switching function, in particular following input of an authorization code.

The design according to the disclosure makes it possible, advantageously, to provide a power-tool operating device that renders possible a variable switchover between a locking switching function and a dead-man's switching function. Thus, advantageously, a power-tool operating device that can be adapted to differing operators and/or fields of application can be realized. Moreover, advantageously, it is possible to provide a power-tool operating device that can be used in differing power tools. In addition, advantageously, a single power tool that is equipped with a power-tool operating device according to the disclosure can be used by differing operators of differing experience in operation of power tools. Thus, advantageously, in the case of an inexperienced operator, it is possible to prohibit switching of the locking function, and to enable only operation of the power tool in the dead-man's switching function.

Also proposed is a power tool, in particular a portable power tool, having at least one power-tool operating device according to the disclosure. A "portable power tool" is to be understood here to mean, in particular, a power tool, for performing work on workpieces, that can be transported by an operator without the use of a transport machine. In particular, the portable power tool has a mass of less than 40 kg, preferably less than 10 kg, and particularly preferably less than 5 kg. The portable power tool may be realized as a portable angle grinder, as hand-held circular saw, as a power drill, as a percussion power drill, as a jigsaw, as a multifunction power tool, as a power plane, as a router, or as another power tool considered appropriate by persons skilled in the art, in particular as a portable, electrically operated power tool. Particularly advantageously, the design according to the disclosure makes it possible to provide a power tool that is convenient and, in particular, that can be operated intuitively.

Additionally proposed is a method for operation of a power tool according to the disclosure, in particular for putting the same into operation. Advantageously, convenient operation can be achieved by means of the design according to the disclosure.

Furthermore, it is proposed that at least one reaction of the electronic unit to an actuation of the operating element be effected, in at least one method step, in dependence on a touch-sensitive characteristic quantity of the further operating element. Thus, advantageously, a high degree of safety can be achieved, against the drive unit being put into operation unintentionally. It is also possible to ensure that the power tool is put into operation only as a result of being handled in a safe manner.

It is additionally proposed that at least one power-tool function can be switched by means of the electronic unit, in at least one method step, in dependence on an actuation of an additional operating element, which is realized as an electronic operating element and which is sensitive to movement. Advantageously, convenient activation or deactivation of a power-tool function can be achieved.

It is additionally proposed that at least one operator movement on the operating element and/or on the further operating element be sensed, in at least one method step, at least for the purpose of switching, in particular activating or deactivating, at least one power-tool function. Advantageously, intuitive operation of the power tool can be achieved.

The power-tool operating device according to the disclosure, the power tool according to the disclosure and/or the method according to the disclosure are/is not intended in this case to be limited to the application and embodiment described above. In particular, the power-tool operating device according to the disclosure, the power tool according to the disclosure and/or the method according to the disclosure may have individual elements, components and units, and method steps, that differ in number from a number stated herein, in order to fulfill a principle of function described herein. Moreover, in the case of the value ranges specified in this disclosure, values lying within the stated limits are also to be deemed as disclosed and applicable in any manner.

BRIEF DESCRIPTION OF THE DRAWINGS

Further advantages are disclosed by the following description of the drawing. Three exemplary embodiments are represented in the drawing. The drawing, the description and the claims contain numerous features in combination. Persons skilled in the art will also expediently consider the features individually and combine them to create appropriate further combinations.

There are shown in.

DETAILED DESCRIPTION

Figure 1:
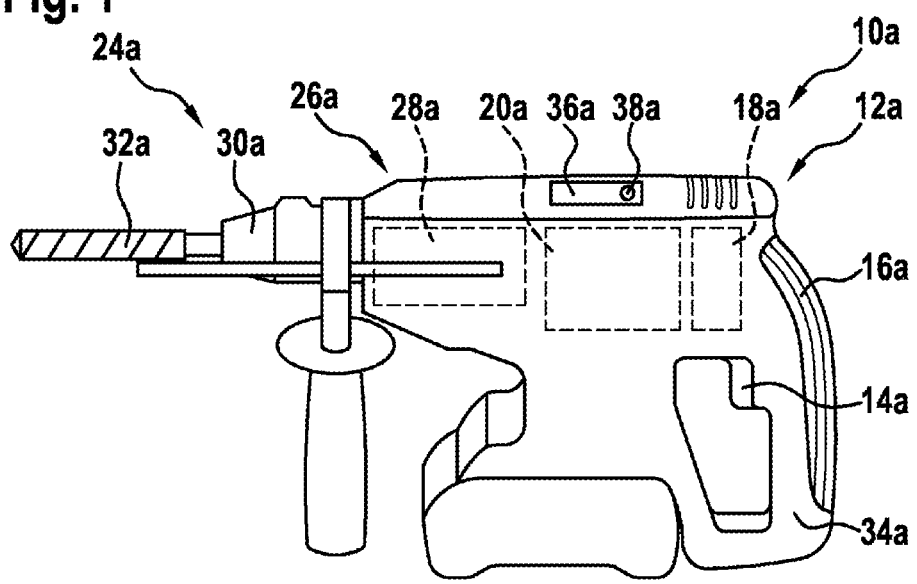
FIG. 1 a power tool according to the disclosure, having at least one power-tool operating device according to the disclosure, in a schematic representation, FIG. 2 an alternative power tool according to the disclosure, having at least one power-tool operating device according to the disclosure, in a schematic representation, and FIG. 3 a further alternative power tool according to the disclosure, having at least one power-tool operating device according to the disclosure, in a schematic representation.

FIG. 1 shows a power tool 24a, having at least one power-tool operating device 10a. The power tool 24a is realized as a portable power tool. In the exemplary embodiment represented in FIG. 1, the power tool 24a is realized as a power drill, in particular as a percussion power drill. It is also conceivable, however, for the power tool 24a to be of another design, considered appropriate by persons skilled in the art. The power tool 24a comprises at least one housing unit 26a, which is designed at least to accommodate a drive unit 20a of the power tool 24a. The drive unit 20a is realized as an electric-motor unit. The housing unit 26a is additionally designed to accommodate an output unit 28a of the power tool 24a. The drive unit 20a is designed to drive, in particular to drive in rotation, via the output unit 28a, a working tool 32a that can be disposed on a tool receiver 30a of the power tool 24a. The working tool 32a is realized as a drill bit. It is also conceivable, however, for the working tool 32a to be of another design, considered appropriate by persons skilled in the art.

The power-tool operating device 10a comprises at least one operating unit 12a, which has at least one operating element 14a that can be actuated by an operator, and at least one further operating element 16a that can be actuated by an operator. The power-tool operating device 10a additionally comprises at least one electronic unit 18a, which is designed at least to switch at least one energy supply of the drive unit 20a at least in dependence on an actuation of the operating element 14a and of the further operating element 16a. The electronic unit 18a is additionally designed to control, by open-loop and/or closed-loop control, a characteristic quantity of the drive unit 20a, such as, for example, a rotational speed (an idling rotational speed, a working rotational speed, or the like), a torque, or another characteristic quantity considered appropriate by persons skilled in the art.

Furthermore, the power tool 24a comprises at least one output unit 36a, which is designed at least to output to an operator at least one item of information regarding an operating state of the power tool 24a. The output unit 36a comprises at least one output element 38a. The output element 38a is realized as an optical output element. The output element 38a is realized as an LED. It is also conceivable, however, for the output element 38a to be of another design, considered appropriate by persons skilled in the art, such as, for example, designed as an acoustic output element (loudspeaker or the like), as a haptic output element (vibration generator or the like), as a display (LCD, LED display, AMOLED display or the like), or as another output element considered appropriate by persons skilled in the art. Moreover, it is conceivable for the output unit 36a to have a multiplicity of output elements 38a, which may differ in design or be of like design, such as, for example, an LED and a display, or the like. The output unit 36a can be controlled by means of the electronic unit 18a. The output unit 36a is preferably designed at least to output an actuation state of the operating element 14a and/or of the further operating element 16a, in order, for example, to inform an operator about a correct actuation.

The operating element 14a and/or the further operating element 16a are/is realized as electronic operating elements/ an electronic operating element that are/is realized so as to be touch-sensitive. In this case, the operating element 14a and/or the further operating element 16a may be realized as resistive, capacitive or inductive operating elements/a resistive, capacitive or inductive operating element. The operating element 14a is disposed on a handle 34a of the power tool 24a. The handle 34a is realized so as to be integral with the housing unit 26a. The operating element 14a is disposed on a side of the handle 34a that faces toward the tool receiver 30a. It is also conceivable, however, for the operating element 14a to be disposed on a different side of the handle 34a, considered appropriate by persons skilled in the art, or at another position on the housing unit 26a, considered appropriate by persons skilled in the art. Alternatively, the operating element 14a is realized as a mechanical operating element. The operating element 14a in this case may be mounted so as to be rotatable, translationally movable and/or pivotable, in particular on the housing unit 26a. In the alternative design, the operating element 14a has at least one switching contact (not represented in greater detail here), which can be opened or closed in dependence on a movement of the operating element 14a. The operating element 14a has signal connection to the electronic unit 18a. A signal that can be generated as a result of an opening or closing of the switching contact of the operating element 14a can be transmitted to the electronic unit 18a as a result of a signal connection of the operating element 14a to the electronic unit 18a. The electronic unit 18a is designed to process the signal, which can be generated by means of the operating element 14a, in particular by means of the switching contact of the operating element 14a.

The further operating element 16a is disposed on the handle 34a. The further operating element 16a is disposed on a side of the handle 34a that faces away from the tool receiver 30a. The further operating element 16a is disposed on the side of the handle 34a that faces away from the side on which the operating element 14a is disposed. It is also conceivable, however, for the further operating element 16a to be disposed on a different side of the handle 34a, considered appropriate by persons skilled in the art, or at another position on the housing unit 26a, considered appropriate by persons skilled in the art. The further operating element 16a is designed to convert a touch by an operator into an electrical signal. The further operating element 16a is preferably realized as a membrane switch. It is also conceivable, however, for the further operating element 16a to be realized as a capacitive or inductive contact surface. Other designs, considered appropriate by persons skilled in the art, are likewise conceivable.

In operation of the power tool 24a, at least one reaction of the electronic unit 18a to an actuation of the operating element 14a is effected, in at least one method step, in dependence on a touch-sensitive characteristic quantity of the further operating element 16a. If an electrical signal is transmitted to the electronic unit 18a as a result of a touch on the further operating element 16a, an energy supply of the drive unit 20a can be activated by means of the electronic unit 18a as a result of an additional actuation of the operating element 14a. If an actuation of the operating element 14a is effected without a signal transmission of the further operating element 16a to the electronic unit 18a, an energy supply of the drive unit 20a remains deactivated. A deactivation of the energy supply of the drive unit 20a, after activation has been effected, is effected as a result of removal of force applied to the operating element 14a, as a result of a renewed actuation of the operating element 14a, in particular tapping of a surface of the operating element 14a, and/or as a result of removal of a touch from the further operating element 16a.

Furthermore, the electronic unit 18a is designed to switch at least one power-tool function, that is other than an activation or deactivation of the energy supply of the drive unit 20a, at least in dependence on a sensed operator movement on the operating element 14a, in particular in the case of the operating element 14a being designed as an electronic operating element, and/or in dependence on a sensed operator movement on the further operating element 16a. The operating element 14a and/or the further operating element 16a may have a touch-sensitive input surface, by means of which, for example on the basis of an actuation sequence, by means of a finger movement on the operating element 14a and/or on the further operating element 16a, or other movements on the operating element 14a and/or on the further operating element 16a that are considered appropriate by persons skilled in the art, for example a change of a rotational speed of the drive unit 20a, an activation of an illumination unit of the power tool 24a, an activation of an automatic working mode, or the like, can be switched by means of the electronic unit 18a.

Furthermore, the electronic unit 18a has at least one locking switching function and at least one dead-man's switching function, which can be switched at least in dependence on an actuation of the operating element 14a and/or of the further operating element 16a. The electronic unit 18a evaluates at least one actuation sequence of the operating element 14a and/or of the further operating element 16a for the purpose of switching the locking switching function or the dead-man's switching function. It is also conceivable, however, for the electronic unit 18a to evaluate an operator movement on the operating element 14a and/or on the further operating element 16a for the purpose of switching the locking switching function or the dead-man's switching function. At least one operator movement on the operating element 14a and/or on the further operating element 16a is sensed, in at least one method step, for the purpose of switching at least one power-tool function.

Figure 2:
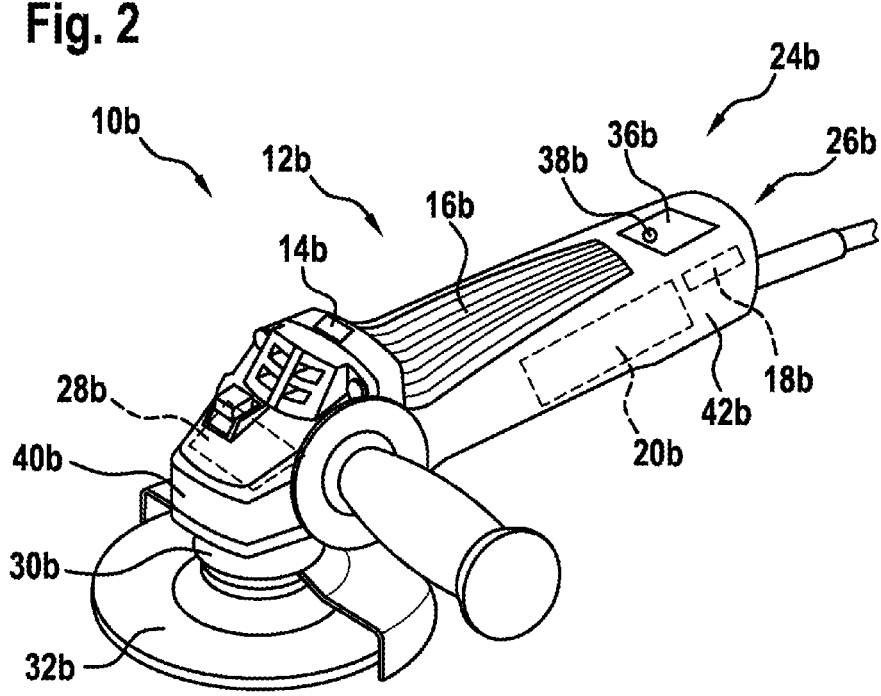
Figure 3:
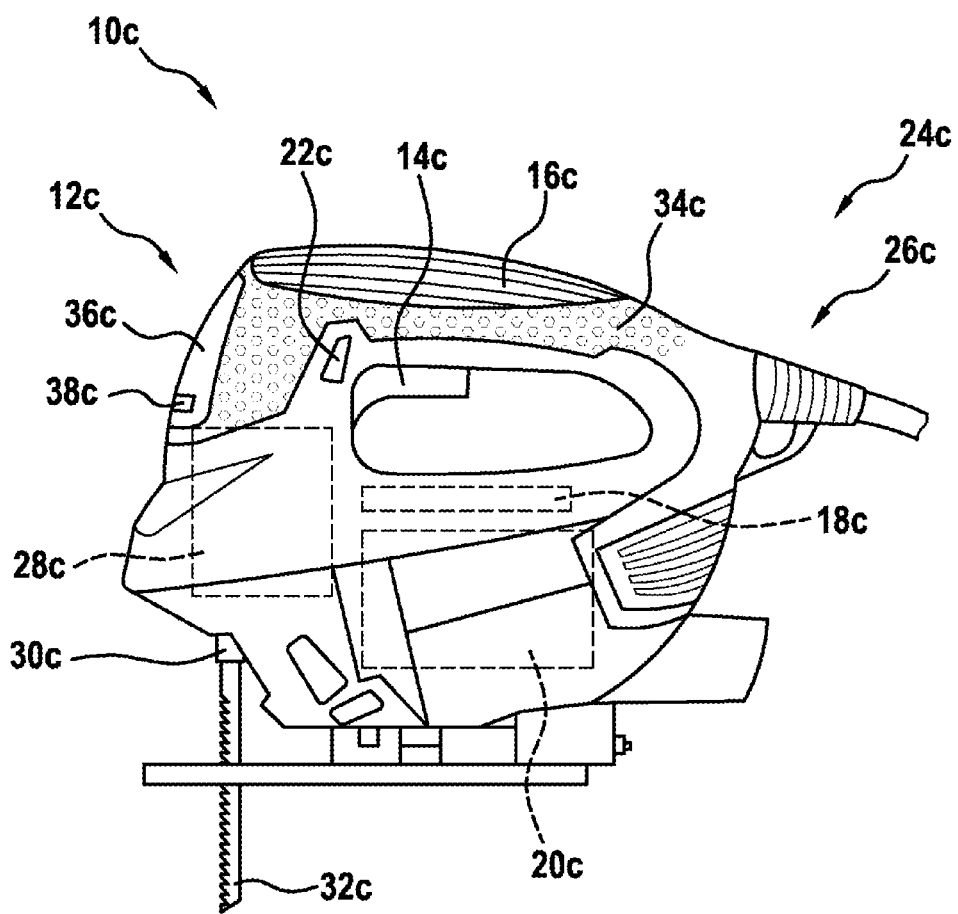

Further exemplary embodiments of the disclosure are shown in FIGS. 2 and 3. The descriptions and the drawing that follow are limited substantially to the differences between the embodiments, and in principle reference may also be made to the drawing and/or the description of the other embodiments, in particular of FIG. 1, in respect of components that have the same designation, in particular in respect of components denoted by the same references. To distinguish the exemplary embodiments, the letter a has been appended to the references of the exemplary embodiment in FIG. 1. In the exemplary embodiments of FIGS. 2 and 3, the letter a has been replaced by the letters b and c.

FIG. 2 shows a power tool 24b, having at least one power-tool operating device 10b. The power tool 24b is realized as a portable power tool. In the exemplary embodiment represented in FIG. 2, the power tool 24b is realized as an angle grinder. It is also conceivable, however, for the power tool 24b to be of another design, considered appropriate by persons skilled in the art. The power tool 24b comprises at least one housing unit 26b, which is designed at least to accommodate a drive unit 20b of the power tool 24b. The drive unit 20b is realized as an electric-motor unit. The housing unit 26b is additionally designed to accommodate an output unit 28b of the power tool 24b. The drive unit 20b is designed to drive, in particular to drive in rotation, via the output unit 28b, a working tool 32b that can be disposed on a tool receiver 30b of the power tool 24b. The working tool 32b is realized as an abrasive disk. It is also conceivable, however, for the working tool 32b to be of another design, considered appropriate by persons skilled in the art.

The power-tool operating device 10b comprises at least one operating unit 12b, which has at least one operating element 14b that can be actuated by an operator, and at least one further operating element 16b that can be actuated by an operator. The power-tool operating device 10b additionally comprises at least one electronic unit 18b, which is designed at least to switch at least one energy supply of the drive unit 20b at least in dependence on an actuation of the operating element 14b and of the further operating element 16b. The electronic unit 18b is additionally designed to control, by open-loop and/or closed-loop control, a characteristic quantity of the drive unit 20b, such as, for example, a rotational speed (an idling rotational speed, a working rotational speed, or the like), a torque, or another characteristic quantity considered appropriate by persons skilled in the art.

The operating element 14b and/or the further operating element 16b are/is realized as electronic operating elements/an electronic operating element that are/is realized so as to be touch-sensitive. In this case, the operating element 14b and/or the further operating element 16b may be realized as resistive, capacitive or inductive operating elements/a resistive, capacitive or inductive operating element. The operating element 14b is disposed on a transmission housing 40b of the housing unit 26b, on a side of the housing unit 26b that faces away from the tool receiver 30b. The further operating element 16b is disposed on a motor housing 42b of the housing unit 26b, on a side of the housing unit 26b that faces away from the tool receiver 30b. It is also conceivable, however, for the further operating element 16b to extend entirely around the motor housing 42b, or for the power-tool operating device 10b to have a multiplicity of further operating elements 16b, which are disposed in a distributed manner around the motor housing 42b. The further operating element 16b is designed to convert a touch by an operator into an electrical signal. The further operating element 16b is preferably realized as a membrane switch. It is also conceivable, however, for the further operating element 16b to be realized as a capacitive or inductive contact surface. Other designs, considered appropriate by persons skilled in the art, are likewise conceivable.

In operation of the power tool 24b, at least one reaction of the electronic unit 18b to an actuation of the operating element 14b is effected, in at least one method step, in dependence on a touch-sensitive characteristic quantity of the further operating element 16b. If an electrical signal is transmitted to the electronic unit 18b as a result of a touch on the further operating element 16b, an energy supply of the drive unit 20b can be activated by means of the electronic unit 18b as a result of an additional actuation of the operating element 14b. The additional actuation is a swipe movement over the operating element 14b. It is also conceivable, however, for the additional actuation to be a different operator movement on the operating element 14b and/or on the further operating element 16b, considered appropriate by persons skilled in the art. For the purpose of reliable identification of the swipe movement, it is conceivable for the power-tool operating device 10b to comprise at least two adjacently disposed operating elements 14b, which are realized as electronic operating elements, which are realized so as to be touch-sensitive, or for the operating element 14b to have two separate touch-contact partial surfaces. Regarding further features and functions of the power tool 24b and/or power-tool operating device 10b represented in FIG. 2, reference may be made to the description of the power tool 24a and/or power-tool operating device 10a represented in FIG. 1.

FIG. 3 shows a power tool 24c, having at least one power-tool operating device 10c. The power tool 24c is realized as a portable power tool. In the exemplary embodiment represented in FIG. 3, the power tool 24c is realized as a jigsaw. It is also conceivable, however, for the power tool 24c to be of another design, considered appropriate by persons skilled in the art. The power tool 24c comprises at least one housing unit 26c, which is designed at least to accommodate a drive unit 20c of the power tool 24c.

The drive unit 20c is realized as an electric-motor unit. The housing unit 26c is additionally designed to accommodate an output unit 28c of the power tool 24c. The drive unit 20c is designed to drive, in particular to drive in oscillation, via the output unit 28c, a working tool 32c that can be disposed on a tool receiver 30c of the power tool 24c. The working tool 32c is realized as a jigsaw blade. It is also conceivable, however, for the working tool 32c to be of another design, considered appropriate by persons skilled in the art.

The power-tool operating device 10c comprises at least one operating unit 12c, which has at least one operating element 14c that can be actuated by an operator, and at least one further operating element 16c that can be actuated by an operator. The power-tool operating device 10c additionally comprises at least one electronic unit 18c, which is designed at least to switch at least one energy supply of the drive unit 20c at least in dependence on an actuation of the operating element 14c and of the further operating element 16c. The electronic unit 18c is additionally designed to control, by open-loop and/or closed-loop control, a characteristic quantity of the drive unit 20c, such as, for example, a rotational speed (an idling rotational speed, a working rotational speed, or the like), a torque, or another characteristic quantity considered appropriate by persons skilled in the art.

The operating element 14c and/or the further operating element 16c are/is realized as electronic operating elements/an electronic operating element that are/is realized so as to be touch-sensitive. In this case, the operating element 14c and/or the further operating element 16c may be realized as resistive, capacitive or inductive operating elements/a resistive, capacitive or inductive operating element. The operating element 14c is disposed on a side of a handle 34c of the power tool 24c that faces toward the tool receiver 30c. The handle 34c is realized so as to be integral with the housing unit 26c. The further operating element 16c is disposed on a side of the handle 34c that faces away from the tool receiver 30c. The further operating element 16c is designed to convert a touch by an operator into an electrical signal. The further operating element 16c is preferably realized as a membrane switch. It is also conceivable, however, for the further operating element 16c to be realized as a capacitive or inductive contact surface. Other designs, considered appropriate by persons skilled in the art, are likewise conceivable.

Furthermore, the operating unit 12c comprises at least one additional operating element 22c, realized as an electronic operating element that is touch-sensitive. The electronic unit 18c is designed to switch at least one locking switching function of the electronic unit 18c at least in dependence on an actuation of the additional operating element 22c. At least one power-tool function, in particular the locking switching function, can be switched by means of the electronic unit 18c, in at least one method step, in dependence on an actuation of the additional operating element 22c, which is realized as an electronic operating element and which is sensitive to movement. For the purpose of activating the power-tool function, in particular the locking switching function, the additional operating element 22c may be tapped and/or touched by an operator. It is also conceivable that a swipe movement may be executed on the additional operating element 22c for the purpose of activating the power-tool function, in particular the locking switching function, or that another operator movement, considered appropriate by persons skilled in the art, may be executed on the additional operating element 22c. For the purpose of deactivating the power-tool function, in particular the locking switching function, a renewed actuation of the additional operating element 22c may be performed. Regarding further features and functions of the power tool 24c and/or power-tool operating device 10c represented in FIG. 3, reference may be made to the description of the power tool 24a and/or power-tool operating device 10a represented in FIG. 1.

The invention claimed is:

1. A power-tool operating device, comprising:
   at least one operating unit that includes:
      an operating element configured to be actuated by an operator; and
      a further operating element configured to be actuated by an operator; and
   at least one electronic unit configured to switch on at least one energy supply of a drive unit only in response to concurrent actuation of at least the operating element and the further operating element,
   wherein one or more of the operating element and the further operating element is configured as a resistive, capacitive or inductive operating element that is touch-sensitive.

2. The power-tool operating device as claimed in claim 1, wherein the operating unit further includes at least one additional operating element configured as an electronic operating element that is touch-sensitive.

3. The power-tool operating device as claimed in claim 2, wherein the electronic unit is further configured to activate and deactivate at least one locking switching function of the electronic unit at least in dependence on an actuation of the additional operating element.

4. The power-tool operating device as claimed in claim 1, wherein:
   the electronic unit has at least one locking switching function and at least one dead-man's switching function; and
   the electronic unit is configured to switch between the at least one locking switching function and the at least one dead-man's switching function at least in dependence on an actuation of one or more of the operating element and the further operating element.

5. The power-tool operating device as claimed in claim 4, wherein:
   in the locking switching function, the electronic unit is configured to maintain the energy supply of the drive unit independent of the operating element and the further operating element remaining actuated; and
   in the dead-man's switching function, the electronic unit is configured to deactivate the energy supply to the drive unit in response to absence of actuation of at least one of the operating element and the further operating element.

6. The power-tool operating device as claimed in claim 5, wherein the electronic unit is configured to switch between the at least one locking switching function and the at least one dead-man's switching function in response to detecting a predetermined actuation sequence on the operating element and the further operating element.

7. A power-tool operating device, comprising:
   at least one operating unit that includes:
      an operating element configured to be actuated by an operator; and
      a further operating element configured to be actuated by an operator; and
   at least one electronic unit configured to switch on at least one energy supply of a drive unit only in response to concurrent actuation of at least the operating element and the further operating element,
   wherein one or more of the operating element and the further operating element is configured as an electronic operating element that is touch-sensitive,
   wherein the electronic unit is configured to switch at least one power-tool function, that is other than an activation or deactivation of the energy supply of the drive unit, at least in dependence on a sensed operator movement across one or more of the operating element and the further operating element.

8. A power tool, comprising:
   at least one power-tool operating device including:
      at least one operating unit that has:
         an operating element configured to be actuated by an operator; and
         a further operating element configured to be actuated by an operator; and
      at least one electronic unit configured to switch on at least one energy supply of a drive unit only in response to concurrent actuation of at least the operating element and the further operating element,
      wherein one or more of the operating element and the further operating element is configured as a resistive, capacitive or inductive operating element that is touch-sensitive.

9. The power tool as claimed in claim 8, wherein the power tool is configured as a portable power tool.

10. The method as claimed in claim 8, further comprising:
    sensing at least one actuation sequence on one or more of the operating element and the further operating element; and
    switching at least one power-tool function, which is not an activation or deactivation of the energy supply of the drive unit, based on the sensed at least one actuation sequence.

11. A method for operation of a power tool with at least one power-tool operating device, the at least one power-tool operating device including at least one operating unit and at least one electronic unit, the method comprising:
    actuating at least one operating element of the at least one operating unit;
    actuating at least one further operating element of the at least one operating unit; and
    switching on at least one energy supply of a drive unit via the at least one electronic unit only in response to concurrent actuation of at least the operating element and the further operating element,
    wherein one or more of the operating element and the further operating element is configured as a resistive, capacitive or inductive operating element that is touch-sensitive.

12. The method as claimed in claim 11, further comprising:
- detecting a touch-sensitive characteristic quantity of the further operating element; and
- effecting at least one reaction of the electronic unit to an actuation of the operating element in dependence on the detected touch-sensitive characteristic quantity of the further operating element.

13. The method as claimed in claim 11, further comprising:
- sensing at least one operator movement on one or more of the operating element and the further operating element; and
- switching at least one power-tool function based on the sensed at least one operator movement.

14. A method for operation of a power tool with at least one power-tool operating device, the at least one power-tool operating device including at least one operating unit and at least one electronic unit, the method comprising
- actuating at least one operating element of the at least one operating unit;
- actuating at least one further operating element of the at least one operating unit, wherein one or more of the operating element and the further operating element is configured as an electronic operating element that is touch-sensitive; and
- switching on at least one energy supply of a drive unit via the at least one electronic unit only in response to concurrent actuation of at least the operating element and the further operating element;
- sensing movement across an additional operating element, which is configured as an electronic operating element that is sensitive to movement across the additional operating element; and
- switching at least one power-tool function with the electronic unit in dependence on the sensed movement across the additional operating element.

* * * * *